United States Patent
McQuaide, Jr. et al.

(10) Patent No.: US 7,697,922 B2
(45) Date of Patent: Apr. 13, 2010

(54) EVENT NOTIFICATION SYSTEMS AND RELATED METHODS

(75) Inventors: Arnold Chester McQuaide, Jr., Berkeley Lake, GA (US); Robert A. Koch, Norcross, GA (US)

(73) Assignee: AT&T Intellectual Property I., L.P., Reno, NV (US)

( * ) Notice: Subject to any disclaimer, the term of this patent is extended or adjusted under 35 U.S.C. 154(b) by 689 days.

(21) Appl. No.: 11/550,522

(22) Filed: Oct. 18, 2006

(65) Prior Publication Data

US 2008/0096531 A1 Apr. 24, 2008

(51) Int. Cl.
*H04W 68/00* (2009.01)
(52) U.S. Cl. .............. 455/412.2; 455/412.1; 455/414.2; 455/414.3; 455/563; 455/567; 709/219; 709/224
(58) Field of Classification Search .............. 455/412.1, 455/412.2, 414.2, 414.3, 563, 567; 709/219, 709/224
See application file for complete search history.

(56) References Cited

U.S. PATENT DOCUMENTS

| 6,687,341 B1 | 2/2004 | Koch et al. | |
| 7,451,330 B2 * | 11/2008 | Tanaka | 713/300 |
| 2002/0087643 A1 * | 7/2002 | Parsons et al. | 709/206 |
| 2004/0106432 A1 * | 6/2004 | Kanamori et al. | 455/556.1 |
| 2004/0242202 A1 * | 12/2004 | Torvinen | 455/412.1 |
| 2005/0192025 A1 * | 9/2005 | Kaplan | 455/456.1 |
| 2005/0250551 A1 * | 11/2005 | Helle | 455/567 |
| 2005/0266825 A1 * | 12/2005 | Clayton | 455/407 |
| 2005/0288005 A1 * | 12/2005 | Roth et al. | 455/418 |
| 2006/0160578 A1 * | 7/2006 | Daniel et al. | 455/566 |

OTHER PUBLICATIONS

QuoTrek Features; http://www.quotrek.com/features/default.asp, accessed Oct. 4, 2006.

* cited by examiner

*Primary Examiner*—Nghi H Ly
*Assistant Examiner*—Christopher Henry
(74) *Attorney, Agent, or Firm*—Myers Bigel Sibley & Sajovec

(57) ABSTRACT

Methods for notifying a user via a wireless communications device regarding the occurrence of an event are provided in which a request is received from a user for notification upon the occurrence of the event. At least one information source is monitored for the occurrence of the event. Once this monitoring indicates that the event has occurred, a notification message that the event has occurred is sent to the wireless communications device. Thereafter, a response is received from the wireless communications device. Related systems, devices and computer program products are also described.

9 Claims, 7 Drawing Sheets

EVENT NOTIFICATION SYSTEMS AND RELATED METHODS

FIELD OF THE INVENTION

The present invention relates to event alerts and, more particularly, to systems and methods for receiving event alerts and controlling access to content associated with such alerts.

BACKGROUND OF THE INVENTION

With the proliferation of media sources and the introduction of new ways to access information content, individuals today have access to more information than ever before, often on a real-time or near real-time basis. However, given the large number of media and information sources (television, radio, newspapers, magazines, e-mails, Internet, etc.), it can be very time consuming for individuals to monitor the media and information sources for information content that may be of interest to them. As such, in many circumstances, individuals may never learn of available, highly pertinent, information content, or may not learn about such content until well after a relevant event has occurred when the value of the information content may be much lower.

Methods and systems for alerting individuals about certain events are known in the art. For example, an individual may want to check a book out of a library that is already checked out by someone else. In this situation, the library may take down the user's request, and then call the individual (perhaps using an automated call-back system) once the book has been returned such that it is available to be checked-out. As another example, various internet sites such as sites run by CNN and the Washington Post provide e-mail alert services. Individuals who access the site may sign-up for and/or subscribe to a service whereby the user is provided an e-mail alert when information content that may be of particular interest to the user becomes available. For example, a user of the site that is interested in a particular professional sports team may sign up for e-mail alerts such that when an article or headline relating to the team is published on the website, the user is sent an e-mail alert with a hyperlink to the published article or headline.

SUMMARY

Pursuant to embodiments of the present invention, methods for notifying a user regarding an occurrence of an event are provided. Pursuant to these methods, the user may request notification upon the occurrence of the event. One or more information sources may then be monitored for the occurrence of the event. Once this monitoring identifies that the event has occurred, a notification message is sent to a wireless communications device associated with the user notifying the user that the event has occurred. Thereafter, a response may be received that was transmitted by the wireless communications device. The notification message may be (or may be converted into) a speech-based message that is played to the user on the wireless communications device.

In some embodiments, this response may be an acknowledgement that the notification message was received. In other embodiments, the response may be a request for additional information regarding the event (which information may then be transmitted to the wireless communications device and/or another communications device associated with the user). In still other embodiments, the response may be a request that an action be initiated by the system that sent the notification message.

Pursuant to further embodiments of the present invention, methods of notifying a user regarding the occurrence of an event are provided in which a notification message is received over a data network such as, for example, a packet-switched network on a wireless communications device, where the notification message indicates that the event has occurred. In response to receiving the notification message, the user is notified regarding the occurrence of the event by playing a speech-based message on the wireless communications device.

In certain embodiments, these methods may also involve playing audio content on the wireless communications device. In some embodiments, the audio content continues to play on the wireless communications device during the playing of the speech-based message. The volume of the audio content may be reduced during the playing of the speech-based message and/or the speech-based message may be played at a lower volume level than a volume level at which the audio content is played. In other embodiments, the playing of the audio content may be suspended during the playing of the speech-based message.

Pursuant to still further embodiments of the present invention, wireless communications devices are provided that include a wireless receiver, a speaker or headphone system, and a processor coupled to the wireless receiver. The wireless receiver is configured to receive a notification message (that provides notice regarding the occurrence of a pre-selected event) over a data network, and the processor is configured to play a speech-based message over the speaker system in response to receiving the notification message.

Other systems, methods and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
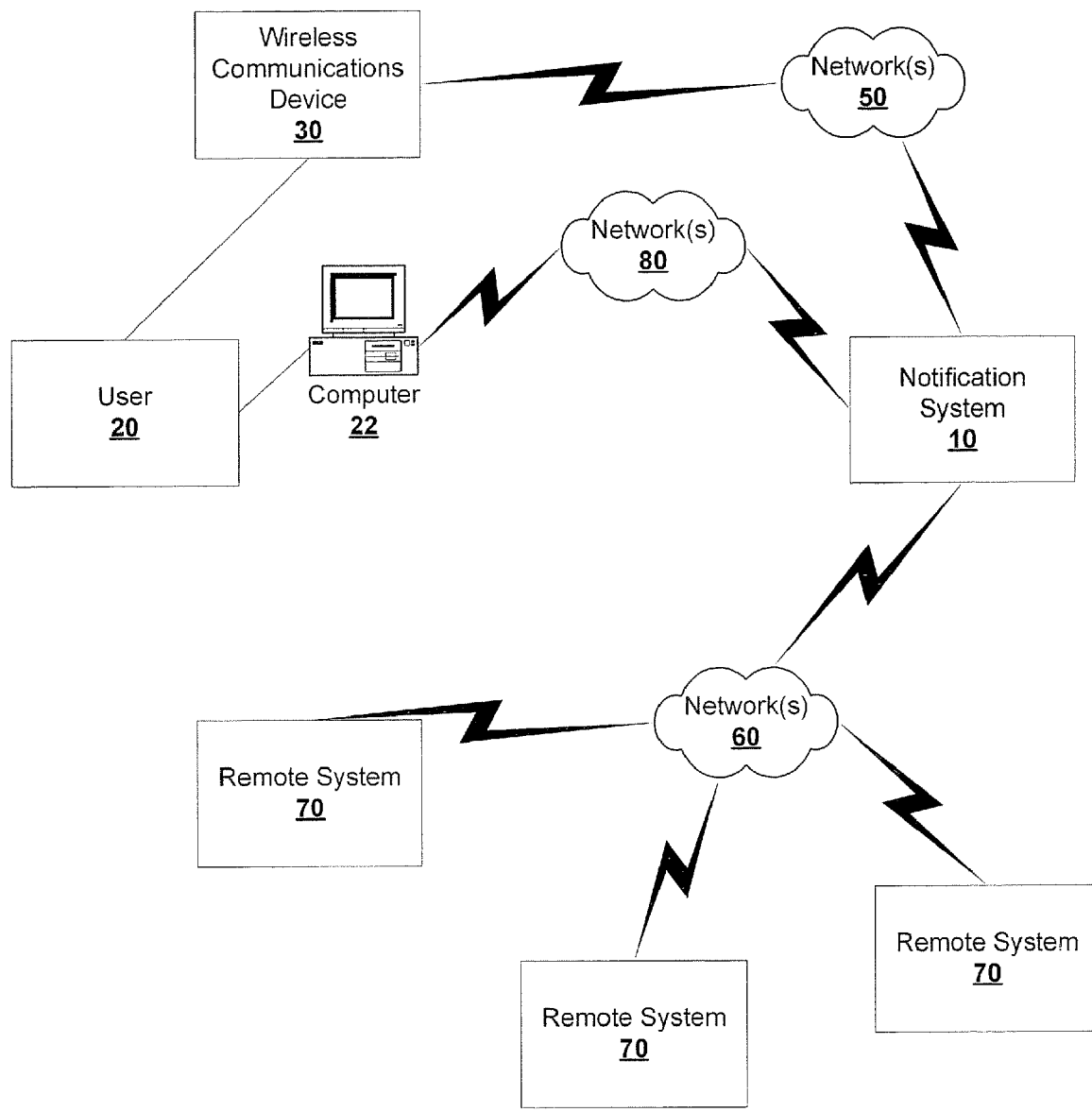
FIG. 1 is a schematic diagram illustrating a notification system according to certain embodiments of the present invention.

Embodiments of the present invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is becoming increasingly common for individuals to spend time listening to personalized audio content over a speaker, headset or earpiece of a portable electronic device. For example, in recent years both the number of cellphone users and the time per day an average user spends on the cellphone has increased. Cellphone use typically involves a user holding the cellphone speaker at or near their ear to receive personalized audio content (i.e., the other half of the conversation). The proliferation of miniaturized MP3 and other digital and analog music players have greatly increased the number of individuals who spend a significant amount of time each week listening to music through earpiece speakers and/or a headset. Bluetooth headsets and earpiece speakers have also grown in popularity as a hands-free way to talk on a cellphone, and many users leave the headset/earpiece speaker on after completing a conversation.

Another recent trend is that both the size and cost of wireless communications systems have been decreasing. While the decrease in the size of a typical cellular telephone is one example of this phenomena, perhaps even more significant is the miniaturization of other (typically shorter range) range wireless communications systems which allow for wireless communications device that fit within a small headset (e.g., a speaker that clips behind the ear) or even in an in-the-ear earpiece speaker. Another recent trend is extension of battery life, enabling users to keep such systems active for a longer period of time, for example listening to music downloaded to cell phones with MP3 capabilities.

Pursuant to embodiments of the present invention, systems and methods are provided that take advantage of both the increased tendency for individuals to use devices that provide personalized audio content to the user and the decreased size and extended battery life of today's wireless communications devices in order to notify users regarding the occurrence of certain events. In particular, according to certain embodiments of the present invention, a user may request that they receive a notification message when any of a variety of pre-defined events occur. A pre-defined event is any electronically-representable occurrence that a user has pre-identified an interest in monitoring and receiving a notification when it occurs. By way of example, a user might request notification when a certain stock reached a specified price, when an airline flight landed, when an alarm was tripped on his home security network or any of a wide variety of other events. According to embodiments of the present invention, notification systems are provided which monitor information sources such as information and/or content servers and/or application servers to determine if any of the pre-selected events have transpired. Upon determining that one of the events has transpired, a notification message may be sent to the user that requested notification when the event occurs.

In certain embodiments of the present invention, the notification message may take the form of a speech-based notification message that is played to the user on a wireless communications device. The wireless communications device may comprise, for example, a cellular telephone, a Bluetooth or other wireless headset, a wireless earpiece speaker or an MP3 or other analog or digital audio player that includes wireless communication capability. The notification system sends a notification message to the wireless communications device upon occurrence of one of a plurality of events that were pre-selected by the user. In response to receiving this notification message, a speech-based notification message is played to the user. In certain embodiments of the present invention, the speech-based notification message may comprise a "whisper" notification that is played to the user at a low volume. In some embodiments, this whisper notification may overlay or replace other audio content that was already playing on the wireless communications device at the time that the notification message was received. In this fashion, users may conveniently receive near real-time notification regarding the occurrence of certain pre-selected events.

In addition to receiving speech-based notification messages, embodiments of the present invention also provide mechanisms through which a user who receives a notification message such as a whisper notification regarding the occurrence of an event can also request additional information regarding the event, or can even request execution of a command in response to receiving the notification. In this manner, systems and methods according to embodiments of the present invention may not only provide users with timely notification, but may also enable users to timely respond to certain events.

FIG. 1 is a schematic diagram illustrating a notification system 10 that may be used to provide speech-based notification messages to a user 20 of the system according to certain embodiments of the present invention. As shown in FIG. 1, the notification system 10 may communicate with a wireless communication device 30 that is associated with the user 20 via one or more networks 50. The wireless communications device 30 may comprise, for example, a cellular or satellite telephone that has capabilities for sending and receiving data messages over a data network, a WiFi or WiMax transceiver, a wireless portable computer, etc. The wireless communications device 30 may comprise, for example, an earpiece that may contain a speaker to present speech-based or other audio notifications of the occurrence of a pre-defined event. In such a manner, the wireless communications device 30 may receive event notifications over a data network and present an audible representation of the event notification to the user via the speaker. In this manner, the user may receive event notifications in an audible form without requiring a two-way audio or voice path such as a voice-capable connection. Further, if the user employs an earpiece, the event notifications may be "whispered" to the user at any time that the device has an active connection to a network to receive data over a data network. The networks 50 may comprise, for example, the Internet and/or other data networks.

As is also shown in FIG. 1, the user 20 may have access to other networked communications devices such as, for example, a desktop computer 22. In certain embodiments of the present invention, this desktop computer 22 (or other networked communications device) may be used to receive additional information relating to a notification message provided by the notification system 10 in certain embodiments of the present invention. The desktop computer 22 may also be used to establish the events that are to be monitored, the conditions that suffice for the sending of a notification message and/or the form of the notifications. In particular, many wireless communication devices may not have a display (or have a very small display), and hence it may not be possible or particularly useful to receive some desired information (e.g., pictures, video, etc.) regarding the event via the wireless communications device. In such instances, the user 20 can instruct the notification system 10 to forward additional information regarding the event to another device such as the desktop computer 22. As shown in FIG. 1, the desktop computer 22 may communicate with the notification system 10 via a network 80. Network 80 may be the same as, or different than, network 50. Desktop computer 22 (or other networked communications device) may be connected to network 80 by wired and/or wireless connections.

The notification system 10 also communicates with one or more remote systems 70. The remote systems 70 may include, for example, information/content servers such as, for example, websites, stock listings, airport flight information, media outlets or any other provider of information. The remote systems 70 may also include application servers such as, for example, a security network, a home network controller, or any other processor that has command or control over other things.

Figure 2:
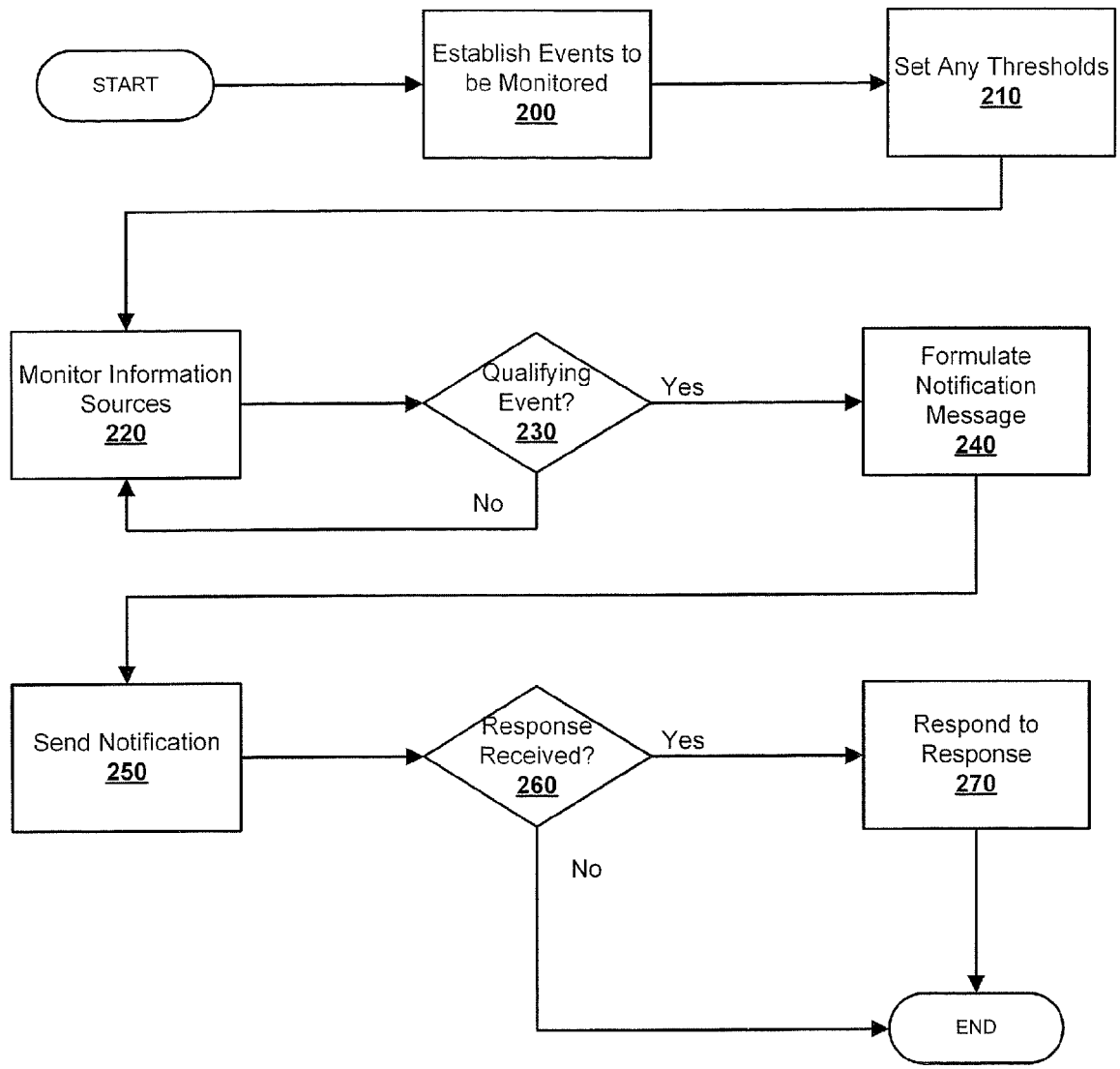
FIG. 2 is a flowchart illustrating operations for notifying a user regarding the occurrence of an event according to certain embodiments of the present invention.

FIG. 2 is a flow chart diagram illustrating operations by which a notification system such as the notification system 10 of FIG. 1 may notify a user regarding the occurrence of an event. As shown at block 200 in FIG. 2, operations may begin with the user (or someone else) establishing the events that are to be monitored. In certain embodiments of the present invention, the notification system may include a web-based interface (or other interface) such as, for example, a series of menus on a web page, which allow a user to specify the events that are to be monitored. The interface may include, for example, a variety of commonly requested events such as travel information (e.g., flight arrivals, automobile accidents on certain roads, traffic congestion information, etc.), financial market activity (e.g., specific stocks reaching or surpassing a certain price) and/or major headlines (e.g., breaking news stories that exceed a certain level of importance). The user may also be provided the ability to enter custom events that are to be monitored (e.g., the tripping of an alarm on the user's home security system, notification of intermediate and/or final scores in sporting events, notification of headline news stories involving certain topics or keywords, etc.). The user 20 may enter this information into the interface using, for example, using the wireless communications device 30 and/or the desktop computer 22.

While a web-based interface provides a convenient and often efficient method for a user to specify the events that are to be monitored, it will be appreciated that other ways of specifying this information may be used. For example, events could be specified using an automated phone menu, by faxing or mailing written information, by providing information to an operator, etc.

As shown in block 210 of FIG. 2, the user may also specify certain thresholds and/or conditions with respect to some or all of the pre-selected events such that a notification message will only be sent if these thresholds and/or conditions are satisfied. These thresholds/conditions may be set at the same time the events to be monitored are selected/entered, or may be done as a separate step. An exemplary threshold is the price that a stock must reach or exceed to trigger sending a notification message to the user. As another example, a user 20 could set a threshold for a notification message once their voice mailbox was some percentage (e.g., 90%) full. It will be appreciated that many events will not have any associated threshold, while other events may have multiple associated thresholds. The user 20 may provide the threshold information to the notification system 10 using, for example, using the wireless communications device 30 and/or the desktop computer 22.

As shown in block 220 of FIG. 2, once the events to be monitored and any associated thresholds/conditions have been entered, the notification system 10 then proceeds to monitor information sources to determine if any of the pre-selected events have occurred. The information sources that are monitored may be selected by the user and/or by the notification system 10. For example, for the stock price example above, the notification system 10 may periodically query a financial source for stock quotes, and use the information obtained from these queries to respond to any and all requests for notification when a stock reaches, exceeds, or drops below a specified price. For other types of events, such as a notification upon the tripping of an alarm on a home security system, the user may need to provide the notification system information regarding the source that should be monitored. For still other types of events, such as "major headlines", the notification system 10 may monitor a plurality of sources such as a number of information and/or content servers.

As shown in block 230 of FIG. 2, the notification system monitors the identified information sources to determine if a qualifying event has occurred—i.e., has any of the pre-selected events occurred. If none of the pre-selected events has occurred, the notification system continues to monitor the information sources (block 230). However, upon determining that one of the pre-selected events has occurred, the notification system 10 formulates a notification message (block 240).

In some embodiments of the present invention, the notification message may comprise a text and/or other data message. The format of the message may be specified by the user when setting up the pre-selected events that are to be monitored, or may be selected by the notification system 10. By way of example, the user could specify that the notification message "General Electric stock selling at X dollars per share" be sent in response to the price of General Electric stock exceeding $25/share, where the notification system fills in the value "X" with the current stock price. As another example, the notification system could use the first ten words from a headline on CNN.com involving pre-selected topic Y as the notification message when a major story is posted on CNN.com regarding topic Y.

In other embodiments, the notification message may comprise an audio file. In such embodiments, the notification system 10 may include a text-to-speech converter that converts a text or other data message into a speech-based audio file. By formatting the notification message into an audio file, the notification system may eliminate the need for conversion of a text or other data file into an audio file at the wireless communications device 30. This may facilitate reducing the size, complexity and/or cost of the wireless communication devices 30 that are used in embodiments of the present invention. In still other embodiments, the notification message could comprise an audio file from another source (e.g., an audio clip from the webcast of a sporting event where the announcer describes a pivotal play during a sporting event), which may eliminate the need for any text-to-speech conversion at the wireless communications device 30.

As shown in block 250, once the notification message has been formulated, it is then sent to a wireless communications device 30 that is associated with the user 20. In certain embodiments of the present invention, the notification message may be transmitted to the user 20 over a packet-switched communications network such as, for example, the Internet.

Although not illustrated in FIG. 2, in some embodiments of the present invention the notification system 10 may obtain and use information regarding whether or not the user 20 is currently using the wireless communications device 30 and/or whether the wireless communications device is turned on so that it can receive notification messages. In particular, if the wireless communications device is turned off, it cannot receive notification messages. While the notification system 10 may learn (via a lack of any acknowledgement) that a notification message that was sent while the wireless communications device 30 was turned off was not received, and hence know to retransmit the notification message at a later time, it may, in some circumstances, be more efficient for the notification system to keep track as to whether or not the wireless communications device 30 is turned off, and, if so, buffer the notification messages and only send them once the wireless communications device 30 has been turned on so that it is capable of receiving them. In still other embodiments, the notification messages could be buffered and sent to the wireless communications device 30 as voice mail messages, e-mail messages, text messages, etc. Moreover, for many events, the value in receiving notification regarding the occurrence of the event may be highly dependent on receiving such notification within a certain period of time. By way of example, notification regarding the occurrence of an automobile accident on the road that a user 20 takes when driving to work may be of little or no value to the user 20 if notification is received after the user 20 has already arrived at work. It may also be distracting and/or counterproductive for a user 20 to receive a long list of older event notification messages each time they turn on the wireless communications device (i.e., notification messages regarding the events that occurred since the last time they turned the wireless communications device 30 off). Accordingly, in certain embodiments of the present invention, the notification system 10 may only forward a subset of the notification messages stored during the time that the wireless communications device was turned off in response to determining that the wireless communication device 30 has been turned back on. For example, in some embodiments, a time sensitive threshold may be set with respect to certain events, such that the notification message is only sent if it can be delivered to the user 20 within a specified period of time.

As shown at decision block 260 of FIG. 2, after the notification message is sent, the notification system 10 then monitors for a response (if any) from the user 20. As discussed in detail herein, a variety of different responses may be provided, ranging from acknowledgments of receipt of the message to commands that the notification system 10 perform some action. If a response is received, the notification system may then provide an appropriate response thereto such as, for example, sending information requested in the response and/or executing a command (block 270). In other embodiments, a response is not needed as shown by the second arrow extending from block 260.

Figure 3:
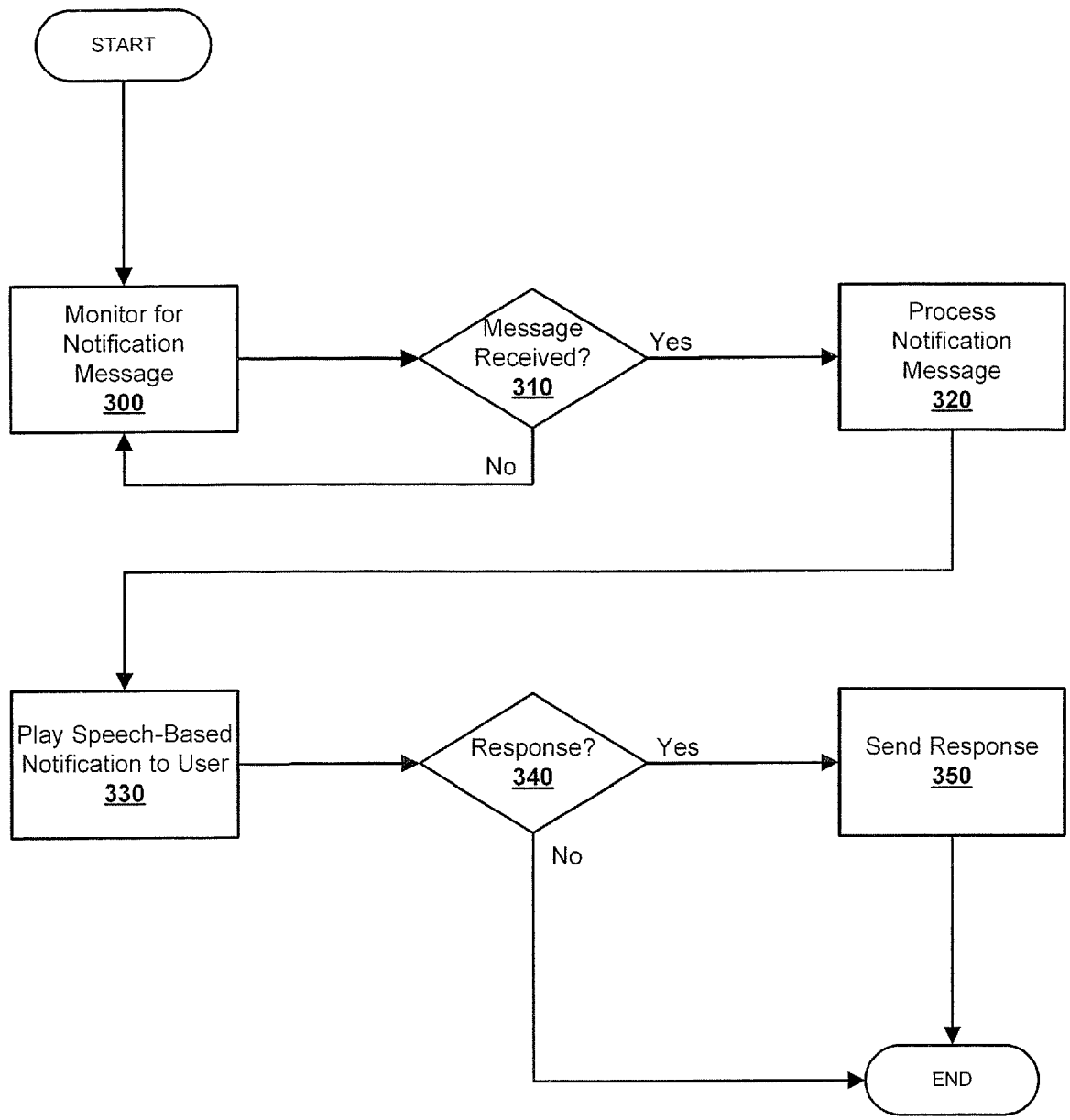
FIG. 3 is a flowchart illustrating operations for receiving and responding to a notification message regarding the occurrence of an event according to certain embodiments of the present invention.

FIG. 3 illustrates operations according to certain embodiments of the present invention for receiving and processing a notification message regarding the occurrence of a pre-selected event and providing the same to the user 20. Each of the operations shown in FIG. 3 may be carried out by a device associated with the user (i.e., on the wireless communications device 30 or the desktop computer 22 of FIG. 1), although one or more of the operations could also be carried out remote from the user 20.

As shown in FIG. 3, operations may start with a wireless communications device 30 associated with a user 20 monitoring for receipt of a notification message (block 300). In certain embodiments of the present invention, the notification message sent from the notification system 10 to the wireless communications device 30 may comprise a data message that is forwarded over one or more packet-switched networks. Each wireless communications device 30 that the notification system 10 communicates with may have a unique address (e.g., an IP address, a TDMA channel, etc.). A separate session may be established between the notification system 10 and each wireless communications device 30. Once the session is established, the wireless communications device 30 goes into a listening mode awaiting receipt of a packet-switched message. To forward a notification message to the wireless communications device 30, the notification system 10 may simply address the message using the unique address associated with the wireless communications device 30.

When a notification message is received (block 310), the wireless communications device 30 may process the notification message (block 320). By way of example, in certain embodiments of the present invention, the notification message may comprise a text message (or the equivalent thereof). As noted above, in embodiments of the present invention, the notification may be provided to the user 20 in the form of a whisper alert or other speech-based notification message. Accordingly, it may be necessary to convert the received notification message into a format appropriate for delivery to the user 20. This may be accomplished, for example, by providing a text-to-speech converter that converts the text (or equivalent data) into an speech-based audio file that may be played to the user 20. Other processing may include stripping off header and other overhead information from the notification message, stripping off and storing additional information contained in the notification message that is only provided to the user 20 if specifically requested, formulating the actual message that is provided to the user 20, etc.

As shown in block 330 of FIG. 3, once the notification message has been processed, a speech-based notification message is played to the user 20. As noted above, in some embodiments of the present invention, the wireless communications device 30 may comprise a stand-alone notification device. Such a device may be implemented, for example, as a cellular headset, as an earpiece speaker with cellular or other wireless communications capability, or as an earpiece speaker having wired or wireless (e.g., Bluetooth) connectivity to another wireless communications device carried by the user (e.g., a cellular telephone). In such embodiments, the speech-based notification message may be played to the user 20 over the headset or earpiece speaker system. In other embodiments, the wireless communications device 30 may comprise a device that is capable of playing other audio output, such as, for example, a cellular telephone (e.g., speech output) or an MP3 digital music player (e.g., music output). In these embodiments, the notification message may be received at a time when the user 20 is receiving other audio content (e.g., carrying on a telephone conversation or listening to music). In these situations, a number of options are available, according to embodiments of the present invention, for providing the speech-based notification message to the user 20.

For example, in some embodiments, the speech based notification message may "overlay" the other audio content in the sense that both audio content streams are played to the user 20 simultaneously. In some such embodiments, the speech-based notification may comprise a whisper alert that is provided at a relatively low volume. The volume of the other audio content may, or may not, be reduced during the time that the speech-based notification message is played to the user 20. In still other embodiments, the other audio content may be suspended while the speech-based notification message is played to the user 20. This suspension may comprise simply disconnecting the other audio content from the speaker system on the wireless communications device 30 or, alternatively, may involve "pausing" the other audio content (as may be possible with a digital or analog music player) so that none of the other audio content is lost during the playing of the speech-based notification message.

Figure 4:
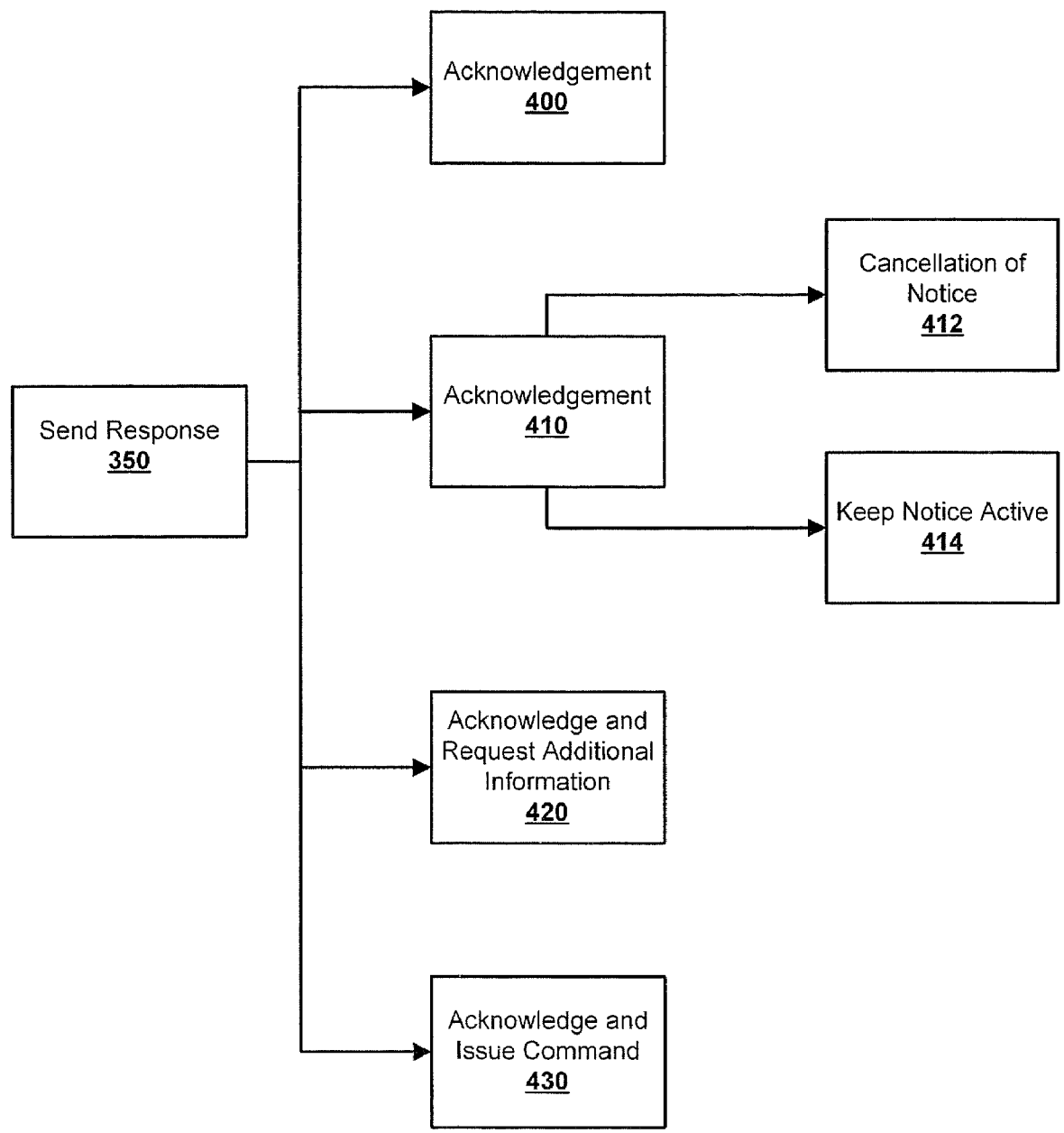
FIG. 4 is a schematic diagram illustrating different responses that a user may provide to a speech-based notification message according to certain embodiments of the present invention.

As shown at block 340 of FIG. 3, after the speech-based notification message is played to the user 20, the user 20 may send a response to the notification system 10 via the wireless communications device 30. As shown in FIG. 4, this response may take on a variety of different forms according to certain embodiments of the present invention. In particular, in some embodiments, the response may simply comprise an acknowledgement 400 that the speech-based notification message has been received by the user 20.

As is also shown in FIG. 4, in other embodiments a more sophisticated acknowledgement 410 may be provided. For example, the acknowledgment 410 may also include a cancellation 412 of the notification. This cancellation 412 would indicate that no future notification messages should be sent with respect to this particular event. Alternatively, the acknowledgement 410 could be accompanied by an indication that the notification should be kept active 414. If kept active, the speech-based notification message will be replayed to the user 20 at, for example, pre-selected and/or user-defined intervals. In some embodiments, the speech-based notification message (or the message that it is generated from) would be stored locally on the wireless communications device 30 in response to the notification being kept active, thereby eliminating any need to retransmit the notification message from the notification system 10 to the wireless communications device each time the speech-based notification message is to be replayed to the user 20.

The acknowledgement 410 may be implemented in a variety of ways. For example, the speech-based notification message may include a voice prompt that informs the user 20 to push a certain button on the wireless communications device or state a certain command to keep the notification message active and to push a different button or state a different command to cancel the notification message. Compliance with one of these prompts by the user 20 may thereby serve as both the acknowledgement 410 and as the command that the notification message be kept active 414 or cancelled 412. In other embodiments, the voice prompt could be omitted (e.g., the user would just know what needed to be done to cancel the notification message or keep it active).

In still further embodiments, the response may comprise a request for additional information 420 regarding the event that has occurred. By way of example, in the case where the pre-selected event is the arrival of an airline flight, additional information regarding the event such as, for example, the arriving gate, the baggage claim, the time of arrival, etc. may be available to the notification system 10. The user 20 may request that some or all of this additional information be provided. It will be appreciated that the manner in which such requests for additional information are prompted and/or carried out may be implemented in a wide variety of ways. For example, the speech based notification message could inform the user 20 that additional information is available and then prompt the user 20 to provide a voice response or other input (e.g., pushing a certain button) if the additional information is desired. In other embodiments, the user 20 could request additional information without any such prompt, and the notification system 10 could provide the information to the extent that it is available. In still other embodiments, the user 20 could request specific information via a voice command, and either the wireless communications device 30 or the notification system 10 could decode the command and make a determination as to whether the information requested by the command is available.

The additional information may be stored at the notification system 10, and then transmitted over network 50 to the wireless communication device in response to a request by the user 20 for such additional information. These embodiments may be used, for example, when the volume of additional information is large and/or when the user 20 may only request a subset of the available additional information. However, in other embodiments, the additional information may be forwarded to the wireless communications device 30 as part of the notification message and then stored locally on the wireless communications device 30. The information is then available locally in the event that the user 20 requests some or all of the additional information regarding the event that occurred. It will be appreciated that the additional information may, but need not be, delivered to the user 20 in the form of a speech-based or other audible message. By way of example, the additional information could be text, graphs, pictures, video feeds, etc. that are routed to, for example, a display on the user's wireless communications device 30 and/or desktop computer 22.

As is also shown in FIG. 4, in still other embodiments of the present invention, the user 20 may be able to issue a command 430 in response to the speech-based notification message that results in an external action. By way of example, a user 20 who receives a notification message that an alarm on his home security system has been triggered may wish to gather more information regarding the cause of the alarm upon receiving the speech-based notification message. Here, the user 20 might issue a command that the home security system activate video cameras (and perhaps provide the user 20 access to the feed from such a camera via the notification system 10 and a display on the wireless communication device 30). In some embodiments, the command may be provided in response to a prompt, similar to one of the ways that a user 20 may request additional information as described above. In other embodiments, the user 20 may provide this command to the notification system 10 in the form of, for example, a voice command that is decoded by the notification system 10. In our example, the notification system 10 would then instruct the user's home security network to implement the command. This type of external command capability is particularly useful when the remote system 70 in FIG. 1 comprises an application server as opposed to an information or content server. The voice command could be decoded using, for example, a speech recognition system provided in the wireless communications device 30 or at the notification system 10.

Figure 5:
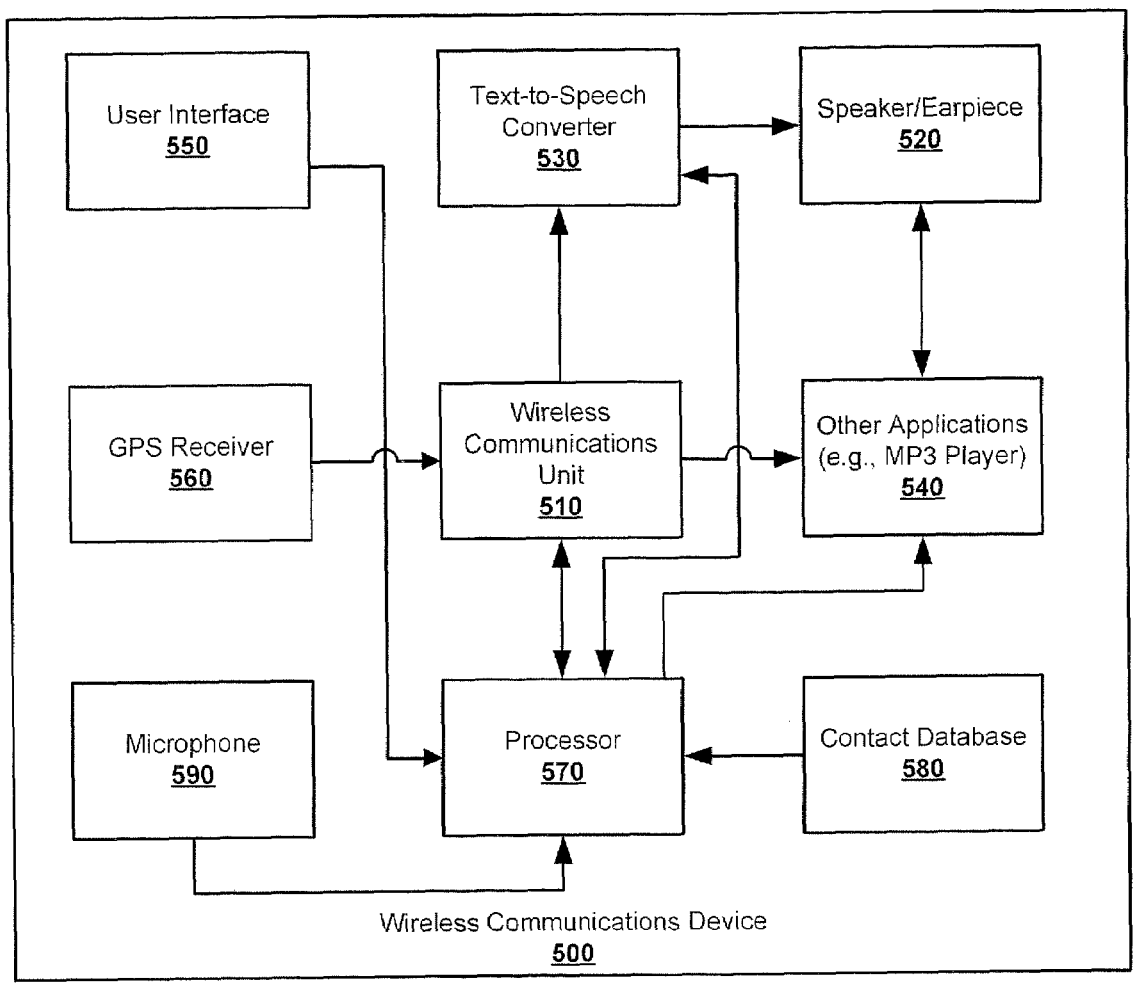
FIG. 5 is a block diagram illustrating an exemplary wireless communications device that may be used to receive notification messages according to certain embodiments of the present invention.

FIG. 5 is a block diagram of an exemplary wireless communications device 500 according to certain embodiments of the present invention. As shown in FIG. 5, the wireless communications device 500 includes a wireless communications unit 510. The wireless communications unit 510 may comprise, by way of example, the transceiver of a cellular telephone, although it also may be any other wireless transmitter/receiver. The wireless communications unit 510 may be coupled to a processor 570. A microphone 590 may also be provided for receiving audio commands from the user 20. The microphone 590 may also be coupled to the processor 570 so that such commands may be deciphered. A speech recognition module that converts a speech-based file into another format may be provided, for example, as part of the processor 570. Another user interface 550 (separate from the microphone 590) such as, for example, the keypad on a cellular telephone, a keyboard, a touch screen, etc. may also be provided, and may also be coupled to the processor 570. In some embodiments, a text-to-speech converter 530 may be provided. The text-to-speech converter 530 may, for example, be coupled to the wireless communications unit 510 (and/or to the processor 570). One or more speakers 520 are also provided for delivering the speech-based notification message to the user 20. The speaker or speakers 520 may be coupled to the text-to-speech converter 530, to the wireless communications unit 510 and/or to the processor 570 in certain embodiments of the present invention (in FIG. 5 the speaker 520 is shown coupled only to the text-to-speech converter 530).

As discussed above, the wireless communications device 510 may also include other applications such as, for example, an analog or digital music player 540, which may be coupled to the speaker 520, to the wireless communications unit 510, etc. Often, these other applications may be the primary reason a user 20 carries the wireless communications device, with the notification capability serving as an added benefit.

In some embodiments, the wireless communications device 500 may also include a GPS receiver 560. The GPS receiver 560 may be used, for example, to provide the notification system 10 information that could then be used in deciding whether or not a notification message is sent to the user 20. In particular, in some embodiments, location information determined by the GPS receiver 560 can be periodically forwarded from the wireless communications device 500 to the notification system 10. The notification system 10 can then use this information as part of, for example, a threshold determination that is used to determine whether or not a notification message is sent to the user 20. For example, the user 20 may have requested notification regarding traffic accidents in his vicinity. Here, the notification system 10 can use information from the GPS receiver 560 to determine that a user is traveling on a particular road or in a general direction and then, upon determining that there has been an automobile accident on that road or in the general vicinity as to where the user appears to be headed, the notification system 10 can send a notification message alerting the user 20 of the location of such an accident. Location data from the GPS receiver 560 that is periodically forwarded by the wireless communications device 500 to the notification system 10 can also be used to determine if the notification message itself and/or additional information regarding an event that is the subject of the notification message should be sent to additional devices associated with the user 20. By way of example, if the GPS data indicates that the user 20 is presently at their office, additional data (e.g., a video clip) associated with a particular notification message might be sent to the user's desktop computer 22 instead of, or in addition to, the wireless communication device associated with the user 20.

In still further embodiments, the wireless communications device 500 may include a contacts database 580. The contact database 580 may be used, for example, in executing commands that are issued by a user 20 in response to receiving a notification message. By way of example, a user 20 might request a notification message each day when someone (e.g., their child or husband, who we will call "Joey") returned home. In certain circumstances, the user 20 might want to place a call to the person upon receiving the notification message. The notification system 10 and/or the wireless communications device 30 might be set tip so that the user 20 could simply state "Call Joey" and a call would be placed to Joey using the telephone number stored in the contact database 580.

Figure 6:
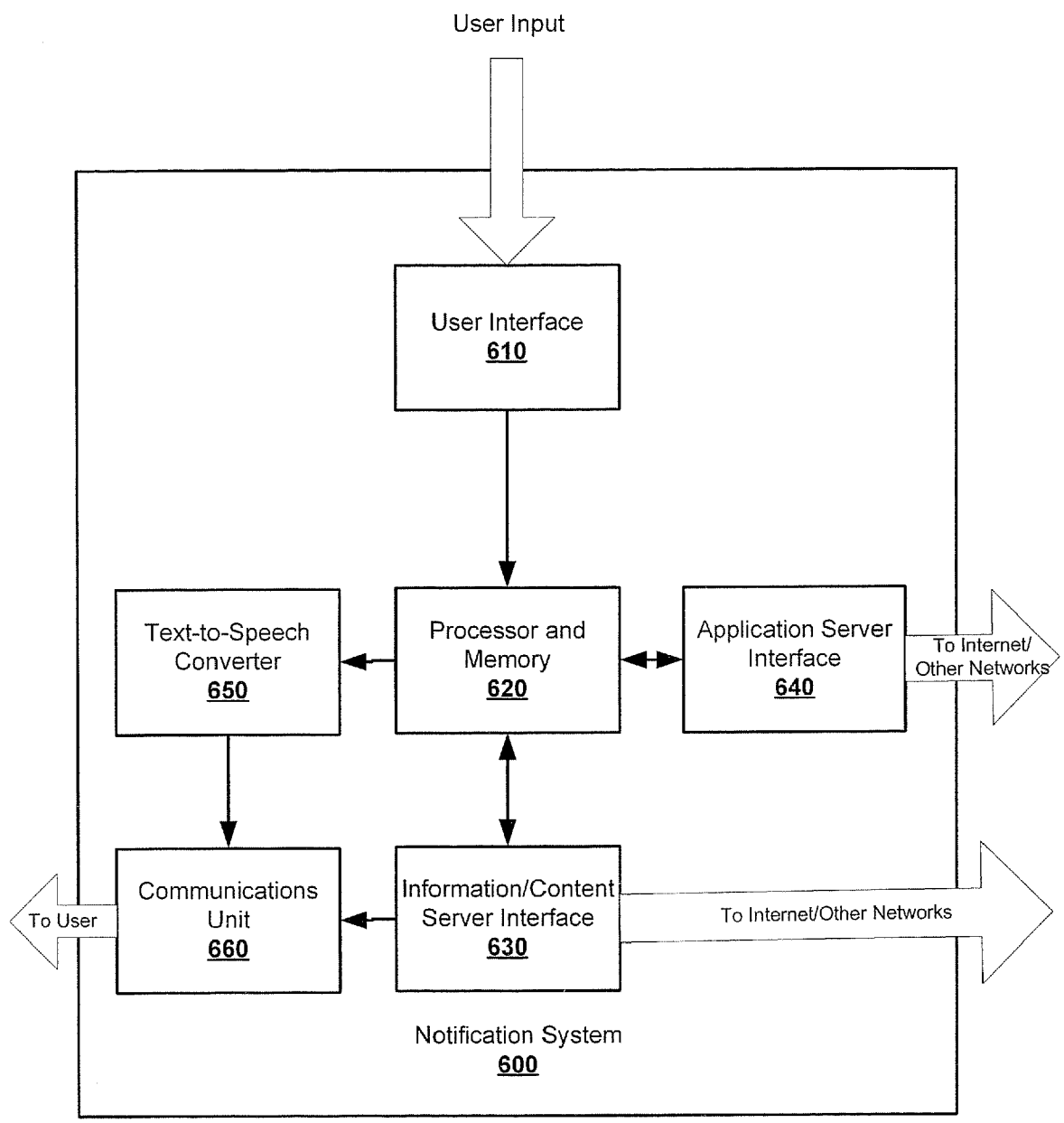
FIG. 6 is a block diagram illustrating a notification system according to certain embodiments of the present invention.

FIG. 6 is a block diagram that illustrates a notification system 600 according to certain embodiments of the present invention. As shown in FIG. 6, the notification system 600 may include a user interface 610, a processor/memory 620, an information/content server interface 630, an applications server interface 640 a text-to-speech converter 650 and a communications unit 660. The user interface 610 may comprise any conventional user interface such as, for example, a web page interface, a telephone interface or other known methods for users to provide information to a computer based system. As discussed above, in some embodiments, the interface may comprise an interactive web page that prompts the user to input the information necessary for proper operation of the notification system 10. The user interface 610 is coupled to the processor/memory 620.

The processor/memory 620 processes information input via the user interface 610 to set Lip the event notification system. In particular, the processor/memory 620 stores a list of pre-selected events and any associated thresholds that are specified by each user of the system, the processor/memory 620 may also store additional information such as, for example, the format of notification messages for specific events, information sources that are to be searched for different events, "presence" information that is gathered for each user, information regarding additional peripheral devices (e.g., desktop computers) that may be used by the system with respect to each user, etc.

Once the events that are to be monitored are established for a particular user, the notification system 600 may monitor a plurality of information sources such as, for example, application servers 640 and information and/or content servers 630. The notification system may also monitor other or additional information sources such as radio or TV stations, newspapers, etc. Typically, one or more pre-selected information sources will be monitored for each specified event, although this need not be the case. The information gathered from the information sources (e.g., servers 630 and 640) is used by the processor/memory 620 to determine if any of the pre-selected events specified by users of the system have occurred. Upon determining that an event has occurred (including satisfaction of any specified thresholds), the processor/memory 600 formulates a notification message which is then communicated to the appropriate wireless communications device 30 via communications unit 660. In the particular embodiment of FIG. 6 a text-to-speech converter 650 is provided so that the notification message may be forwarded as an audio file, although it will be appreciated that the text-to-speech converter 650 may be omitted.

Figure 7:
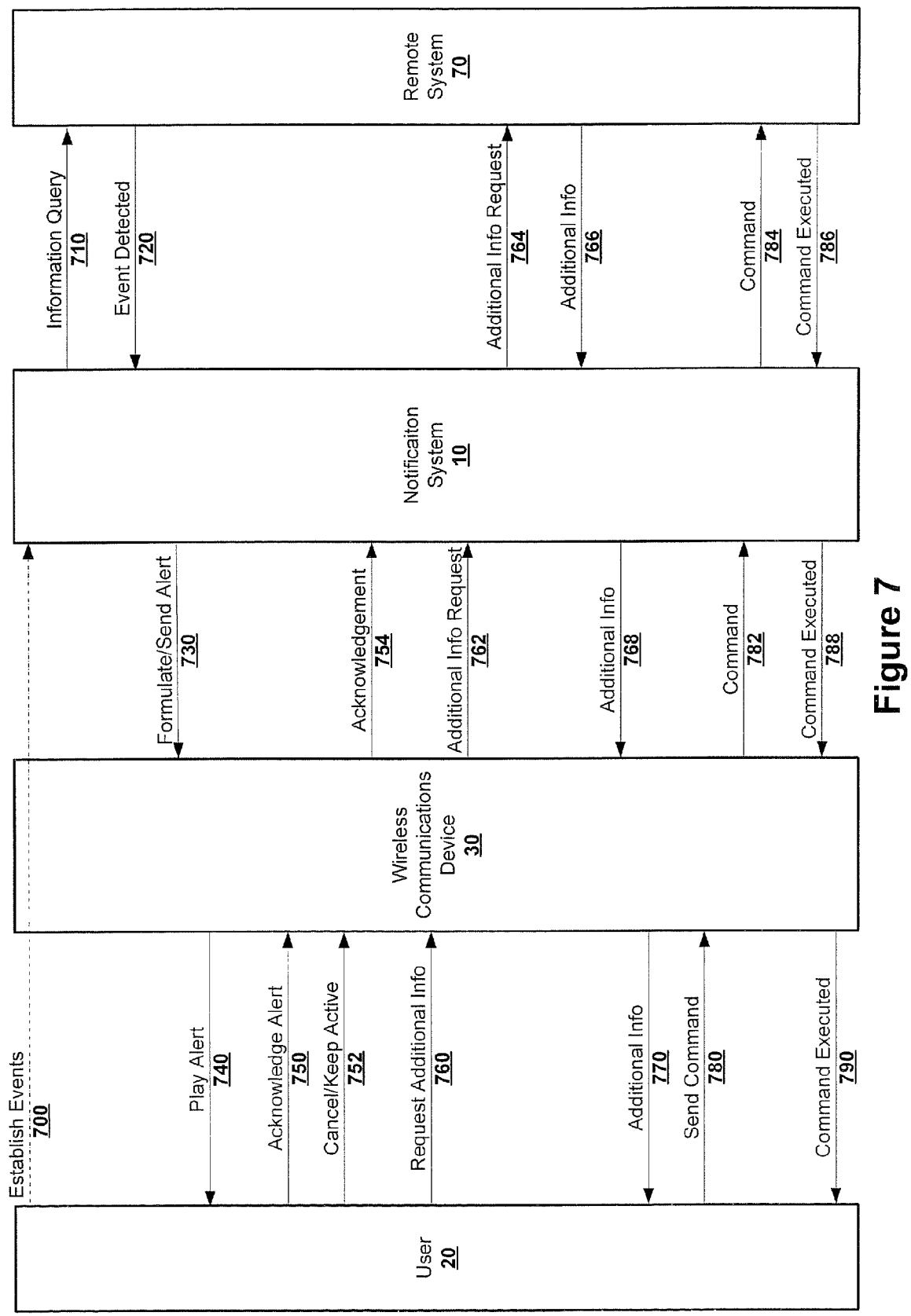
FIG. 7 is a schematic diagram that illustrates exemplary message flows between some of the components of FIG. 1.

FIG. 7 is a schematic diagram that illustrates exemplary message flows between some of the components of FIG. 1. As shown in FIG. 7, the overall system may include a notification system 10, a remote information source 70 and a wireless communications device 30 that is associated with a user 20. First, at line 700, the user 20 establishes the events that are to be monitored by the notification system 10 (the dashed line indicates that this may, or may not, be done through the wireless communications device 30). Then, at line 710, the notification system 10 then monitors one or more remote systems 70 for information in order to determine if any of the pre-selected events that are to be monitored have occurred. Line 720 illustrates that at some point the monitored information may indicate that one of the pre-selected events has occurred. When this happens, the notification system 10 formulates and sends a notification message (or "alert") (line 730) to the wireless communications device 30. At line 740, the wireless communications device 30 plays a speech-based notification message to the user 20. In response, the user 20 may acknowledge receipt of the message, and may indicate that the notification message is to be cancelled or kept active (line 752). At line 754, the wireless communications device 30 may then forward any such acknowledgement to the notification system.

As is also shown in FIG. 7, the user 20 may also respond to the playing of the speech-based notification message by requesting additional information regarding the event. This request is input by the user 20 into the wireless communications device 30 (line 760), and may then, in some embodiments, be forwarded to the notification system 10 (line 762) and/or a remote system 70 (line 764). The remote system 70 (line 766), the notification system 10 (line 768) and/or the wireless communications device (line 770) may then provide the requested additional information to the user 20. Similarly, the user 20 may also send a command to the wireless communications device (line 780), which is then forwarded to the notification system and/or to the remote system (lines 782, 784). The command is then executed by the appropriate entity/device, and a message advising the user 20 that the command was executed may be forwarded to the user 20 (lines 786, 788, 790).

Pursuant to further embodiments of the present invention, the wireless communications device 30 may be configured to autonomously detect certain events and then autonomously generate a message that notifies the notification system 10 that the event has occurred. By way of example, the wireless communications device 30 could include weather sensing equipment such as, for example, a thermometer, a barometer, a humidity reader, a wind sensor, etc. Based on output from these sensors, a processor on the wireless communications device 30 could detect changes in the weather and send notification messages to the notification system 10 with information regarding such weather changes. It will be appreciated that a wide variety of sensors could be included on the wireless communications device 30, and that the wireless communications device 30 could act as an event detector for a wide variety of pre-defined events. In this manner, some or all of the wireless communications devices 30 that are in communication with the notification system 10 could act as remote information sources 70 (see FIG. 1) in certain embodiments of the present invention.

As will be appreciated by one of skill in the art, the present invention may be embodied as a method and/or as a system. Moreover, aspects of embodiments of the present invention may take the form of a computer program product on a computer-usable storage medium having computer-usable program code embodied in the medium. Any suitable computer readable medium may be utilized including hard disks, volatile memory, non-volatile memory, CD-ROMs, optical storage devices, a transmission media such as those supporting the Internet or an intranet, or magnetic storage devices.

Computer program code for carrying out operations of the present invention may be implemented using programmable aspects of existing application programs. Aspects of the computer program code may also be written in an object oriented programming language such as Java®, Smalltalk or C++ and/or using a conventional procedural programming languages, such as the "C" programming language. The program code may execute entirely on a single computer or on multiple computers, which may or may not be co-located.

The present invention is described above with reference to flowchart illustrations and block diagrams of methods and systems according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of receiving notice regarding the occurrence of an event on a wireless communications device while an audio content is playing on the wireless communications device, the method comprising:

requesting notification regarding the occurrence of an event;

establishing a threshold that must be met for it to be deemed that the event has occurred;

receiving over a data network at the wireless communications device a notification message that indicates that the event has occurred that may be used in playing a speech-based notification message on the wireless communications device; and playing the speech-based notification message on the wireless communications device while simultaneously continuing to play the audio content on the wireless communications device during the playing of the speech-based notification message, wherein the speech-based notification message is played at a first volume level that is lower than a second volume level at which the audio content is played.

2. The method of claim 1, the method further comprising sending a request for additional information regarding the event.

3. The method of claim 2, wherein the request for additional information is generated in response to a speech-based command.

4. The method of claim 1, the method further comprising:

receiving an invitation to send a command; and sending the command from the wireless communications device to a notification system and/or to another device.

5. The method of claim 1, the method further comprising reducing a volume of the audio content during the playing of the speech-based notification message to a third volume level that is between the second volume level and the first volume level.

6. A wireless communications device, comprising:

a wireless receiver that is configured to receive a notification message from a data network;

an audio source;

a first speaker system;

a second speaker system;

a text-to-speech converter that is configured to convert text in the notification message into a speech-based notification;

a microphone and a speech recognition module that is configured to convert the output of the microphone into a non-speech format;

a processor coupled to the wireless receiver, the processor configured to play the speech-based notification message over the first speaker system in response to receiving the notification message while the audio source simultaneously plays music over the second speaker system;

a wireless transmitter that is configured to send a response to the notification message;

wherein the notification message comprises a notification regarding the occurrence of a pre-selected event, and wherein the processor is further configured to play the speech-based notification at a first volume level that is lower than a second volume level at which the music is played.

7. The wireless communications device of claim 6, wherein the processor is further configured to replay the speech-based notification message at predefined intervals until cancellation of the notification message.

8. The wireless communications device of claim 7, further comprising a memory coupled to the processor, wherein the processor is further configured to store additional information regarding the pre-selected event in the memory, and to provide the information in a speech-based format in response to a request for the additional information.

9. The method of claim 2, further comprising receiving additional information in response to the request for additional information at a second communications device that is associated with the user.

\* \* \* \* \*